W. ROMEISER AND L. SCHIFF.
DEVICE FOR PREVENTING THE THEFT OF MOTOR CARS AND THE LIKE.
APPLICATION FILED FEB. 4, 1921.
1,428,450.
Patented Sept. 5, 1922.
3 SHEETS—SHEET 1.
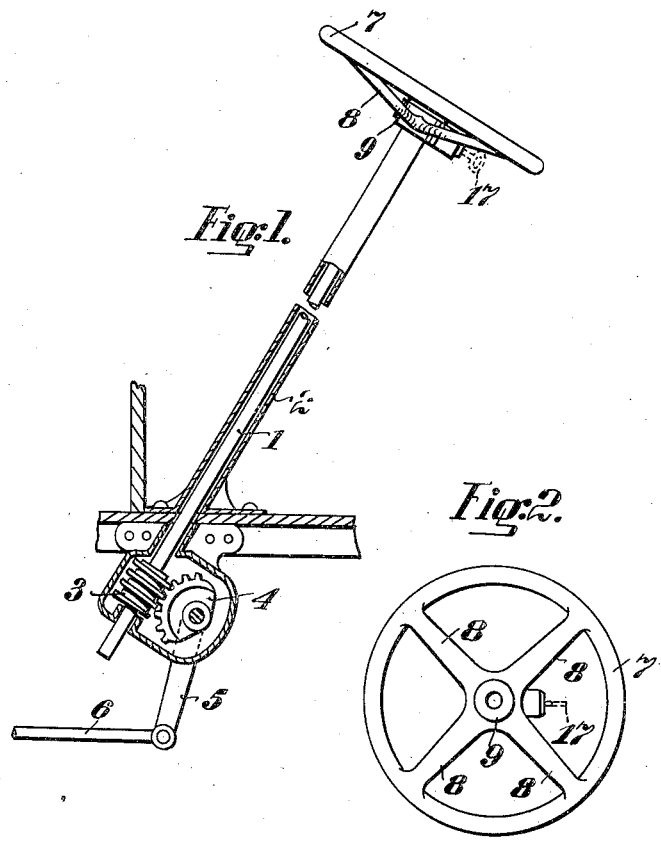
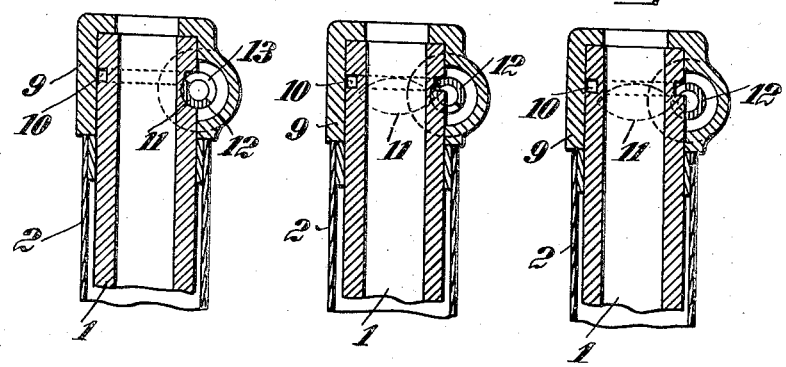

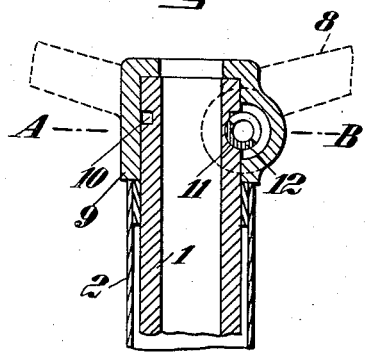
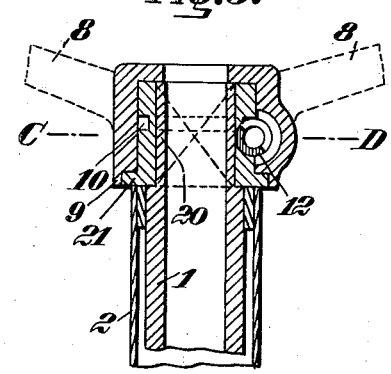
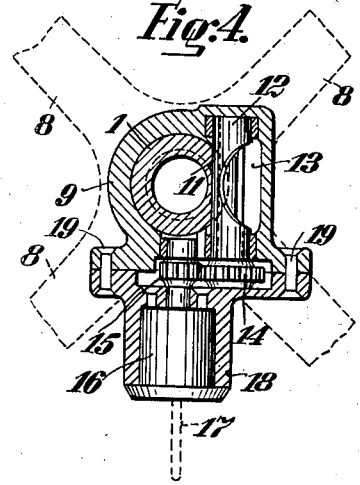
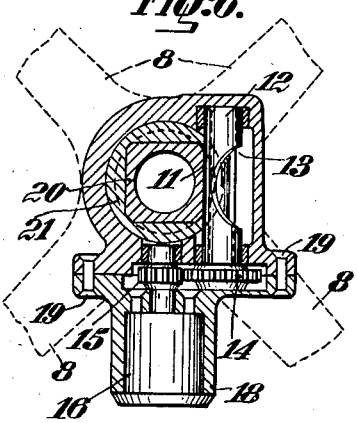

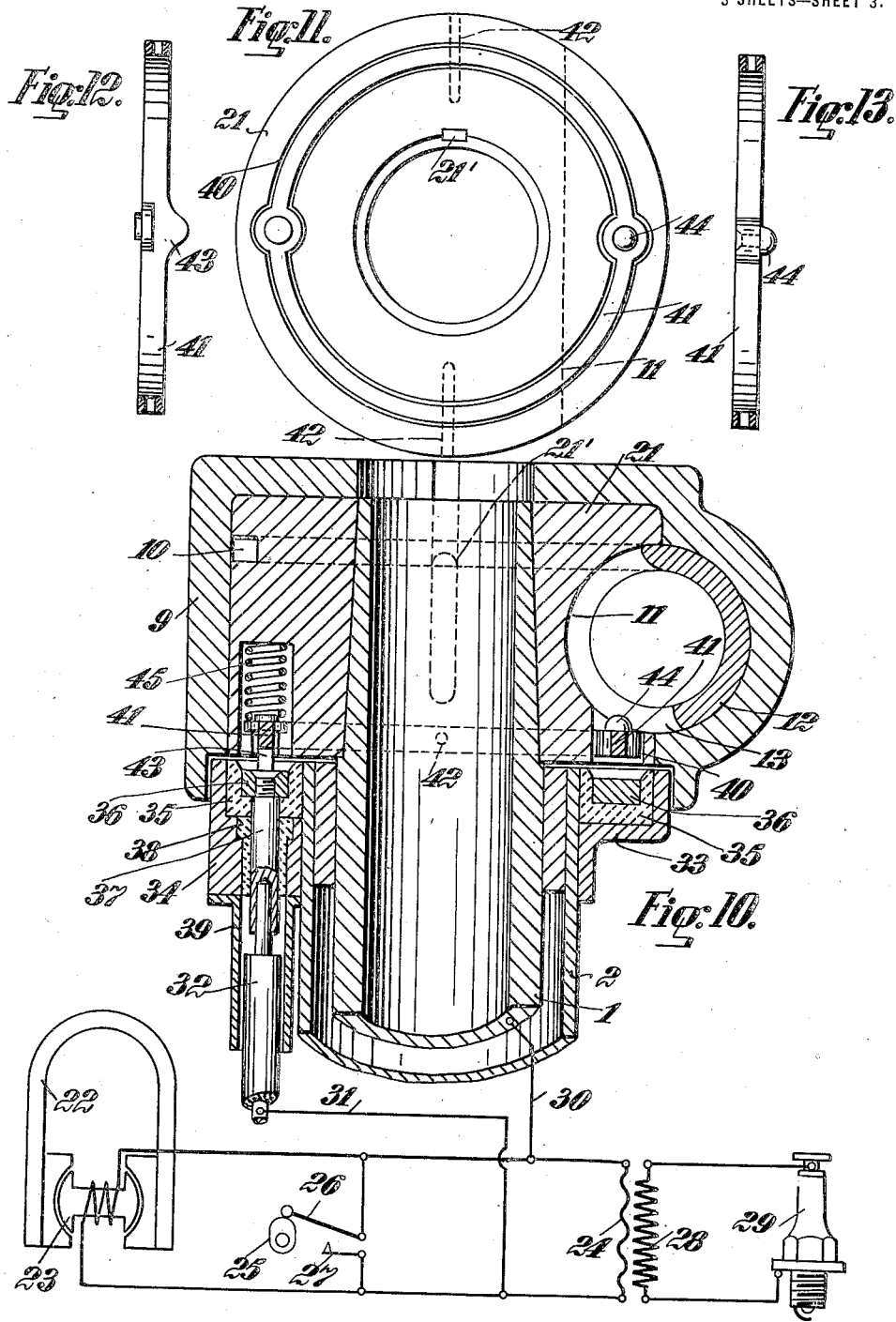

Patented Sept. 5, 1922.

1,428,450

UNITED STATES PATENT OFFICE.

WILHELM ROMEISER, OF LICHTERFELDE, NEAR BERLIN, AND LUDWIG SCHIFF, OF BERLIN, GERMANY, ASSIGNORS TO HANS MALZOFF, OF DRESDEN, SAXONIA, GERMANY.

DEVICE FOR PREVENTING THE THEFT OF MOTOR CARS AND THE LIKE.

Application filed February 4, 1921. Serial No. 442,564.

*To all whom it may concern:*

Be it known that we, WILHELM ROMEISER, a citizen of Germany, residing at 70 Wedigenweg, Lichterfelde, near Berlin, Germany, and LUDWIG SCHIFF, a citizen of Germany, residing at 61 Koniggratzerstrasse, Berlin, Germany, have invented certain new and useful Improvements in Devices for Preventing the Theft of Motor Cars and the like (for which applications have been filed in Germany January 15, 1920, and November 24, 1920; in Austria December 20, 1020, and in France December 20, 1920), of which the following is a specification.

This invention relates in general to a device for preventing thefts of automobiles. It relates more particularly to a device of the kind in which the steering wheel can be loosened on the steering shaft with the aid of a key so as to cause the steering wheel to revolve freely on its shaft and to render the steering of the car, and hence the driving of the same, impossible.

An arrangement of this kind would be incomplete as long as the steering wheel could be immediately removed from the steering shaft, or if it could be removed after the loosening of a screw, because a thief would then be able to simply remove the steering wheel and replace it by another or by a lever which he could attach to the projecting end of the steering shaft and then use as a means for turning the same.

In accordance with the present invention the device which is adapted to be actuated by a key, and which in its one position connects the steering wheel firmly to the shaft, whilst it releases the wheel and allows it to turn freely on the shaft in its second position, is so constructed that when it is in its second position it prevents the steering wheel from being removed from the steering shaft and when it is in a third position it permits of the steering wheel being mounted upon, or removed from, the steering shaft.

Another feature of the new device is that it enables a special fixing screw to be dispensed with. It offers the greatest conceivable security against theft, can be readily manipulated from the driver's seat, is easy to handle, and can be easily and cheaply manufactured.

A steering wheel provided with the novel device can, after it has been fitted with a suitable adapting member, be immediately mounted on any steering shaft in place of the existing steering wheel.

The apparatus can be made to afford an additional security by so arranging it that when the steering wheel is loosed on the steering shaft the ignition apparatus of the motor of the car is rendered inoperative, as by short-circuiting the primary circuit of this apparatus. By this arrangement a danger is obviated which might arise through carelessness or forgetfulness on the part of the driver. This danger is that the driver might first start the motor, then get onto his seat, grasp the steering wheel firmly with his hands, and drive off with the car in spite of having forgotten to fix or lock the steering wheel to the steering shaft with the aid of the key provided for this purpose. The car is then unsteerable and an accident to be feared if the driver does not stop the motor in time and apply the brake.

Constructional forms of the invention are illustrated in the drawing in which—

Fig. 1 shows an elevation of the steering column (partly in section) of a motor car whose steering wheel is fitted with the novel device, Fig. 2 is a plan view of the steering wheel, Figs. 3 and 4 show a constructional form in which the steering shaft is adapted at the outset for the new device, Fig. 3 being a vertical section through the steering column, the steering shaft and the hub of a steering wheel fitted with the novel device, and Fig. 4 a horizontal section on the line A—B of Fig. 3.

Figs. 5 and 6 illustrate a constructional form in which an adapting member, onto which a steering wheel fitted with the novel device can be put, is mounted on the square end of a finished steering shaft, Fig. 5 being a vertical section through the steering column, the steering shaft, the adapting member, and the hub of the steering wheel, and Fig. 6 a horizontal section on the line C—D of Fig. 5.

Figs. 7 to 9 show the novel device in its three different positions,

Fig. 7 showing its position when it fixes the steering wheel firmly on the steering shaft, Fig. 8 illustrating its position when it merely prevents the steering wheel from being lifted off the steering shaft, and Fig. 9 showing its position when it permits of the steering wheel being taken off the shaft Figs. 10 to 13 illustrate the novel device in combination with means for rendering the ignition apparatus inoperative when the wheel is loosed upon the shaft, Fig. 10 is a vertical section of the hollow steering shaft, the protecting tube, and the hub of the steering wheel. This figure also shows diagrammatically the electric circuits of the ignition apparatus.

Fig. 11 is a bottom view of the collar arranged on the top end of the hollow steering shaft, Fig. 12 is a view of a ring disposed in the said collar as seen from the right of Fig. 11 when a section is taken through the ring on a vertical diametrical line and Fig. 13 is a corresponding sectional view of the ring as seen from the left.

1 is the steering shaft which is situated in a well known manner in a fixed steering column 2 and, through the medium of a worm 3, engages with a toothed sector 4, Fig. 1, which, in turn, transmits the motion of the steering wheel through the rods 5, 6 to the guiding wheels of the car. Fixed to the top end of the steering shaft 1 is the steering wheel 7, which has spokes 8 and a hub 9 equipped with the novel device.

In the constructional forms shown in Figs. 3, 4, 7, 8 and 9 a peripheral groove 10 is made at the top cylindrical end of the steering shaft 1 and besides a semi-cylindrical notch 11 is milled into one side of the shaft, Figs. 3 and 7 showing a cross-section and Fig. 4 a longitudinal section of this notch, whilst a back view of it is indicated in Figs. 8 and 9 by broken lines. A hollow, cylindrical revoluble tubular bolt 12 that is journaled in the hub 9 of the steering wheel and has a lateral notch 13 is adapted to engage with the semi-cylindrical notch 11 in the steering shaft. Fixed on the revoluble bolt 12 is a toothed wheel 14 which is in mesh with another toothed wheel 15 which latter is half the size of the former and is fixed on the central shaft of a pin lock and turned through an angle of 180° by a full turn of the key 17. When the cylindrical bolt is in the position shown in Figs. 3, 4 and 7 it serves to fix the steering wheel immovably on the steering shaft so that when the wheel is turned the steering shaft is carried round with it. If, by inserting the key 17 and giving it a full turn, half a turn is imparted to the cylindrical bolt so as to bring it into the position shown in Fig. 8, the part of the body of the bolt that is located beside the notch 13 will be turned out of the semi-cylindrical notch 11 of the steering shaft 1, but the top edge of the said part will then engage with the peripheral groove 10 of the steering shaft and prevent the wheel from being pulled off the shaft; it will, however, not permit the wheel to revolve freely on the steering shaft and thus render it impossible to steer or drive the motor car. When the key 17 is withdrawn from the lock the position of the hollow revoluble bolt 12 can only be either that shown in Fig. 7 or that illustrated in Fig. 8. Hence when the key 17 is removed there will be no possibility of detaching the steering wheel. To do this the key must be inserted again and then turned slightly back so as to bring the hollow revoluble bolt 12 into the position shown in Fig. 9.

The pin lock 16 is arranged in a special cast or pressed casing 18 which is joined to the hub by rivets 19.

The modification shown in Figs. 5 and 6 differs from the above-described type only in that the steering wheel equipped with the novel device is mounted on an ordinary steering shaft 1 with a square top end 20. This square end 20 is adapted to the new requirements by an adapting member 21 being fitted onto it which has a square hole that fits onto the square end 20 and a cylindrical periphery with a circular groove 10 and a semi-cylindrical notch 11. After the adapting member 21 has been slipped onto the square end of the steering shaft its joint with the said end is welded or soldered so as to make it undetachable. In other respects the modification is precisely similar to the first construction form described.

In the constructional form shown in Figs. 10–13 an adapting member 21 is fixed by a key 21' to the conical top end of the steering shaft 1, which is journaled in the fixed steering column 2. The exterior of the adapting member is cylindrical and has a circular grove 10 and a semi-cylindrical transverse notch 11 cut into it. Journaled in the hub 9 of the steering wheel is a hollow revoluble bolt 12 which has lateral notch 13. The hollow bolt may be turned in the manner described above into three different positions through the medium of a pin lock. In the position shown in Fig. 10 the hollow bolt engages with the groove 10 and the steering wheel will turn loosely on the adapting member 21 but cannot be lifted off this member. If the hollow cylindrical pin 12 is turned clockwise to such an extent that it is brought out of engagement with the groove 10 the steering wheel can be lifted and detached from the adapting member 21.

Now this contrivance is associated with the motor ignition apparatus, a well known form of which is shown diagrammatically in Fig. 10. 22 is the magnet between whose poles an armature 23 rotates. The current generated flows from the armature through the primary coil 24, and when the potential reaches its maximum value the coil is short-circuited by the cam 25 causing a contact lever 26 to make contact with contact anvil 27. The current induced in the secondary coil 28 causes sparks to fly across a spark gap at the end of the spark plug 29 and these sparks ignite the gas mixture in the motor.

One of the two wires leading from the armature 23 to the primary coil 24 is connected through a wire 30 to the steering shaft 1 and the other is connected through a wire 31 with a flexible conductor 32. Fixed (by soldering for example) to the top end of the steering column 2 is a ring-shaped body 33 which may be a brass casting. The cross section of this ring 33 is Z-shaped (see right side of Fig. 10). At its left side the ring 33 is cast with a downwardly extending barrel 34. Arranged in the annular upwardly-turned cavity formed by the ring 33 between its outer rim and the column 2 is a ring 35 consisting of vulcanite or some other suitable insulating material in which a metallic ring 36 is embedded. At the left side of the ring 36 is a threaded metallic pin 37 which is screwed into the ring from below and riveted. The pin 37 passes through the barrel 34 from which it is insulated by a suitable insulating sleeve 38. The bottom protruding end of the pin 37 has a central hole in which the wire of the flexible conductor 32 is fixed, as by solder. The conductor 32 may be protected by a metal tube 39 which is slipped over the conductor and fixed with the aid of lateral flanges (not shown) and screws to the bottom end of the barrel 34. An annular groove 40 is cut into the bottom surface of the adapting member 21. Arranged to swing on two pivots 42 in this groove 40 is a ring 41. At its left side the ring 41 is fitted with a downwardly extending projection 43, and at its right side it bears an iron rivet with an upwardly extending head 44. A spring 45 embedded in the adapting member 21 tends to tilt down the left side of the ring 42 so as to bring the metallic projection 43 into contact with the insulated metallic ring 36 and thus short-circuit the primary circuit of the ignition apparatus. When the bolt of the steering wheel lock is in the position shown ing Fig. 10 the left side of the ring 42 will be tilted down because the projection 44 will then enter the notch 13 of the said bolt 12. But if the hollow cylindrical bolt 12 is turned through 180° so as to lock the steering wheel to the steering shaft the said bolt 12 will press the projection 44 down and thus lift the contact 43 off the contact 36. The short-circuit will then be removed from the primary ignition circuit.

The illustrated device thus prevents the motor car from being started before the steering wheel is locked to the steering shaft.

We claim:—

1. In combination with the steering wheel and steering shaft of an automobile or the like, a peripheral groove in the shaft, a lateral notch in the shaft, a notched locking bolt substantially at right angles to said shaft arranged between steering wheel hub and the shaft, and a key for turning the locking bolt into three positions, the bolt being so shaped that in one position it engages only with the said peripheral groove, whereby the wheel is enabled to rotate on the shaft, in a second position it engages with the said lateral notch, whereby it prevents the wheel from rotating on the shaft, and in a third position it is out of engagement with the groove and the notch, whereby it enables the wheel to be detached from the shaft.

2. In combination with the steering wheel, steering shaft and motor ignition apparatus of an automobile or the like; a member associated with the said wheel and adapted to be brought into three positions; a key for bringing the said member into the said three positions; the said member being adapted to fix the wheel immovably on the shaft in its one position, to loose the wheel on the shaft whilst preventing its detachment therefrom in a second position, and to permit of the detachment of the wheel from the shaft in a third position; and means for rendering the said ignition apparatus inoperative when the said member is in its second position.

3. In combination with the steering wheel, steering shaft and the motor ignition circuit of an automobile or the like; a member associated with the said wheel and adapted to be brought into three posititon; a key for bringing the said member into the said three positions; the said member being adapted to fix the wheel immovably on the shaft in its one position, to loosen the wheel from the shaft while preventing its detachment therefrom in a second position, and to permit of the detachment of the wheel from the shaft in a third position; and means for short-circuiting the ignition circuit when the said member is in its second position.

4. In combination with the steering wheel, steering shaft, steering column, and the motor ignition circuit of an automobile or the like; an insulated metal ring fixed to the steering column; an electrical connection between the insulated ring and one lead of the primary ignition circuit; a locking member associated with the said wheel and adapted to be brought into three positions; a key for bringing the said locking member into the said three positions; the said member being adapted to fix the wheel immovably on the shaft in its one position, to loosen the wheel from the shaft while preventing its detachment therefrom in a second position, and to permit of the detachment of the wheel from the shaft in a third position; a rocking metal member associated with the shaft; a spring for moving the rocking metal member against the said insulated ring when the locking member is in its second position; means for moving the rocking metal member away from the insulated ring when the locking member is in its first position; and a second electrical connection between the rocking member and the other lead of the primary ignition circuit.

5. A device for preventing theft of motor vehicles comprising a steering shaft having a peripheral groove and a semi-cylindrical notch, a tubular member substantially at right angles to said shaft and having a notch, key-operated mechanism to actuate said member to either engage said notch, or said groove, or to become disengaged from both, for the purpose set forth.

6. A device for preventing theft of motor vehicles which comprises a steering shaft having a peripheral groove and a transverse semi-cylindrical notch at said groove, a tubular member having a transverse notch, said member capable of seating in said semi-cylindrical notch, the edge of the notch of said tubular member capable of engaging said groove and the latter notch capable of permitting disengagement of said shaft and member, gearing to rotate said member, and key-controlled mechanism to actuate said gearing.

In witness whereof we have hereunto set our hands in the presence of two witnesses.

WILHELM ROMEISER.
LUDWIG SCHIFF.

Witnesses:
  ALFRED HIEN,
  ADOLPH LEORDE.